Figure 1:
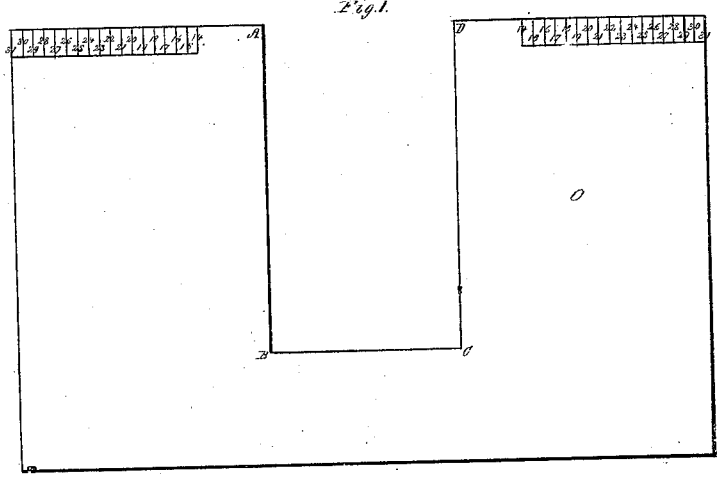
Figure 3:
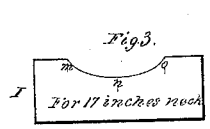

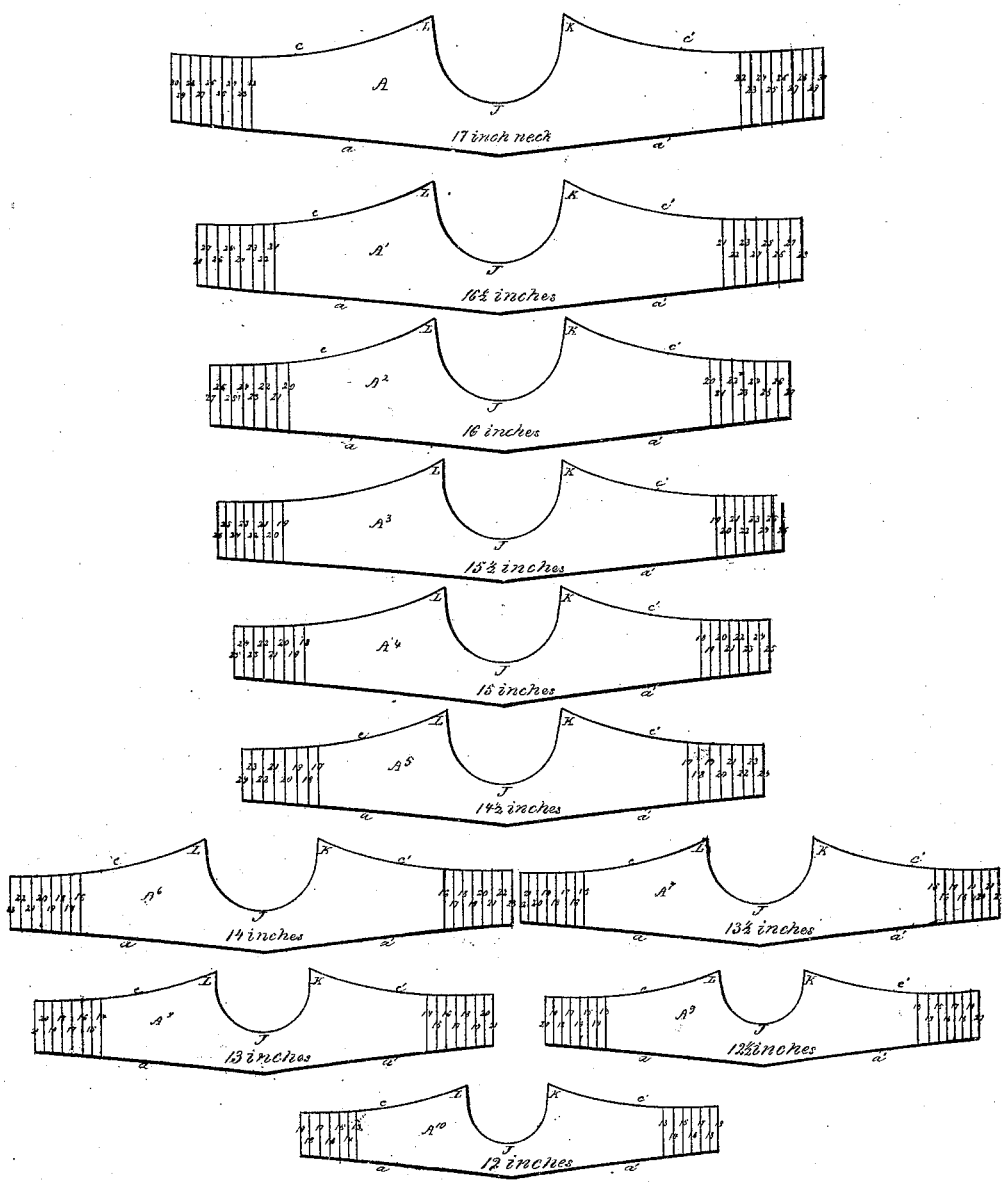

J. W. Rand,
Shirt.

No. 78,325.  Patented May 26, 1868.

Sheet 2. 3 Sheets

For 17 inches neck

H

For 16½ inches neck 16 inches neck

15½ inches neck 15 inches neck

14½ inches neck 14 inches neck

13½ inches neck 13 inches neck

12½ inches neck 12 inches neck

Witnesses
R. Jones
F. Simonds

Inventor
J. W. Rand

J. W. Rand,
Shirt.
No 78,325.
3 Sheets, Sheet 3.
Patented May 26, 1868.
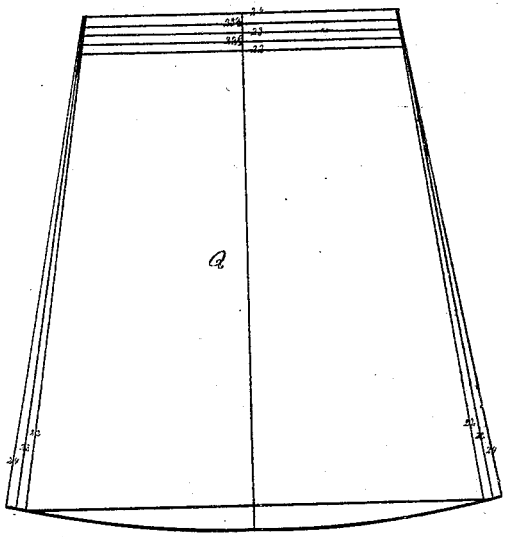
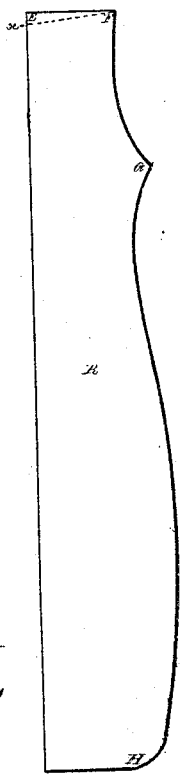
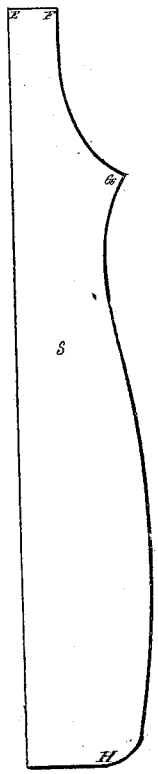
Witnesses
R. Jones
B. Simonds
Inventor
J. W. Rand

UNITED STATES PATENT OFFICE.

JOHN W. RAND, OF CHARLESTOWN, MASSACHUSETTS.

*Letters Patent No. 78,325, dated May 26, 1868.*

IMPROVEMENT IN PATTERNS FOR CUTTING OUT SHIRTS.

*The Schedule referred to in these Letters Patent and making part of the same.*

TO ALL PERSONS TO WHOM THESE PRESENTS SHALL COME:

Be it known that I, JOHN W. RAND, of Charlestown, in the county of Middlesex, and State of Massachusetts, have invented a "New and Useful System of Cutting Shirts or Shirt-Patterns;" and I do hereby declare the same to be fully described in the following specifications, and illustrated in the accompanying plates 1, 2, 3 of drawings.

Of such drawings—

Plate 1 denotes the series of "yokes" as formed with the neck-spaces, &c., to be hereinafter described.

Figure 2:
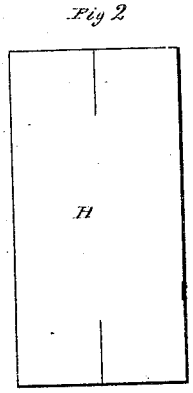
Figure 4:
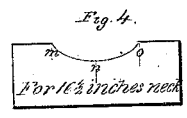
Figure 5:
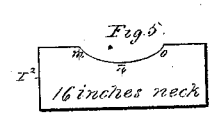
Figure 6:
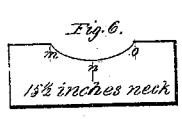
Figure 7:
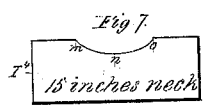
Figure 8:
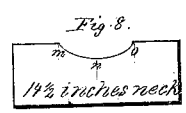
Figure 9:
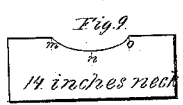
Figure 11:
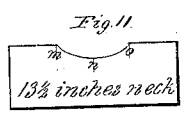
Figure 10:
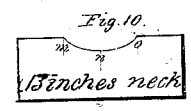
Figure 12:
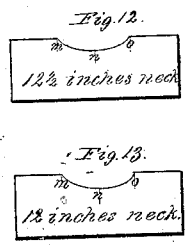
Figure 13:
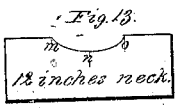

In plate 2, Figure 1 denotes a front view of the pattern for forming or laying out the front portion of shirts of any ordinary size. Figure 2 denotes the bosom-pattern. Figures 3, 4, 5, 6, 7, 8, 9, 10, 11, 12, and 13 are patterns for hollowing the neck portion of bosoms.

In plate 3, Figure 14 denotes the sleeve-pattern, Figures 15 and 16 being the front and back-side patterns, to be described hereinafter.

The object of my invention is to produce a simple mode or system of cutting shirts or shirt-patterns, whereby a person wholly unskilled in the art can, by means of the same, readily cut out a shirt or shirt-pattern of any ordinary size.

In plate 1 of the drawings, A $A^1$ $A^2$ $A^3$ $A^4$ $A^5$ $A^6$ $A^7$ $A^8$ $A^9$ $A^{10}$ denote a series of yokes, each of which is formed with an obtuse-angular back, $a$ $a'$, and having in its front a curved neck-space, L J K, each of said openings being flanked by two curved portions $c$ $c'$.

This series of neck-openings is so graduated as to fit men having the largest-sized necks as well as those having the smallest, and also of any intermediate size, or, in other words, those whose necks measure seventeen inches in circumference, down to those who measure only twelve inches.

Furthermore, each of these yokes has its two ends provided with a scale of measurements, denoting the widths for the backs of shirts adapted to the persons whose necks measure the number of inches marked under the neck-opening; that is, the numbers on the arms or ends of the yoke-patterns indicate the width of the back, or the points at which to cut the back, of a shirt for a person whose measurement across the shoulders is a given number of inches.

In fig. 1 of plate 2, O denotes a rectangular pattern for laying out the front of a shirt or shirt-pattern, the said pattern having a rectangular bosom-space, A B C D, extending down from its upper side in manner as represented. This front-pattern I form with a scale of measurements for the width of the fronts of the various sizes of shirts and shirt-patterns, so arranged as to correspond with the distances different persons may measure across the shoulders. For instance, if a person measures twenty inches across the shoulders, we have only to lay the pattern on the cloth to be cut, and mark the point 20 on each side of the bosom-opening. These numbers are so graduated as to correspond with the same numbers on the yoke, (for giving the width of the back of the shirt,) but the numbers on the said front-pattern do not indicate the actual number of inches, but simply show the width the front should have, (allowing for fullness across the breast, and also for all seams,) to be a counterpart for a back of a given size.

In figs. 15 and 16, plate 3, R and S denote, respectively, the patterns for forming the sides of the front and back of the shirt, F G denoting the curved arm-opening or "size," and G H the curved side lines. The dotted line F $x$ denotes the line to be brought into coincidence with the bottom line of the yoke in laying out the back of a sack-shirt.

In plate 2, I I', &c., denote the series of patterns for hollowing out the neck portions of the bosoms for different-sized necks, which are simply to be laid upon the bosoms, and the curved part, $m$ $n$ $o$, cut or hollowed out.

In fig. 2, plate 2, H denotes the bosom-pattern, which is of a rectangular shape, and is of the proper size for cutting a bosom for any ordinary-sized person.

The sleeve-pattern Q, as shown in fig. 14 of plate 3, is formed tapering from its top to its bottom, the upper part being curved to fit to the arm-size of the shirt. This sleeve-pattern is provided with two scales, or measurements, or divisions for different lengths and widths of sleeve, the whole being as shown in the said figure.

As the neck-band of the shirt and the wristbands are plain rectangular pieces of cloth, no pattern is needed for either, they being of such width as may be desirable.

My invention is designed for cutting either what are termed "sack" or "yoke"-shirts.

Having described the parts of my said invention, I will now proceed to describe the manner of using the same.

If we suppose that the proper measurements have been taken, that is, the circumference or size of the neck, the distance across the shoulders, and the length of the arm and its circumference at the shoulder and the wrist, if we desire to cut what is termed a "yoke-shirt," we first take the front-pattern O and lay it on the cloth to be cut; next, commencing at the point A, mark out the rectangular or bosom-space A B C D; next, from the point A, mark along the top of the pattern to the left, until you come to the number that the person measures across the shoulders; next, starting from the point D, mark along the top of the pattern toward the right side, until you come to the same number on that side; next, remove this pattern, and take the side-pattern for front; place the corner F at the point you stopped marking on the left side, being careful that the top of the side-pattern coincides with the pencil-line on the cloth; next, mark from F to G, thence to H; reverse the pattern, and in like manner mark out the other side; next, draw across the bottom, or from the points H H, and we have the front of the shirt laid out; next, cut in accordance with the lines so made, and the front is finished.

To cut the back, lay the yoke-pattern, that corresponds with the size of the neck, lengthwise of the cloth; next, mark from J to K, and along the top to the number that the person measures across the shoulders; next, mark from J to L, and along the top of the pattern to the same number on the opposite side; next, mark along the bottom of the yoke, between these two numbers; next, remove the said pattern, and draw a line between each of the two end lines, and you have the yoke. Cut two yokes for each shirt, (one for a lining of the other;) next, lay the side-pattern for back on the cloth far enough from the edge to allow it to be marked around; next, mark from F to G, thence to H; next, draw a line from the point E, straight across the cloth, a distance four or five inches longer than the distance the person measures across the shoulders; that is, if he measures twenty inches, draw the line twenty-four or twenty-five inches. This extra four or five inches is to give the requisite fullness, and, in making, is to be gathered in. Next, reverse the side-pattern, and place the corner F at the point you stopped marking, and draw around it as on the other side, just described; cut out on lines made, and we have the back of the shirt; next, lay the sleeve-pattern Q on the cloth, and mark from the centre of the top part, in each direction, to the figures denoting the width of the top of the sleeve; next, lay off the lower part, or that encompassing the wrist, of the required width; and next draw the two side lines, and we have the pattern for the sleeve.

To cut a sack-shirt, we first lay out and cut the front precisely in the manner of a yoke-shirt, as before mentioned. To cut the back of a sack-shirt, we first mark out the yoke crosswise of the cloth; next, remove the pattern, and take the back-side pattern, and place the point F on the bottom line of the yoke, at its lower corner; next bring the dotted line F x of the pattern into coincidence with the lower line marked on the cloth, and draw the line F G H; next reverse the pattern, and place the part F upon the opposite lower corner of the yoke, and bring the line F x into coincidence with the lower line of the yoke, and draw the line F G H; and lastly, draw a line from H to H.

When cutting out the back of a sack-shirt, do not cut the yoke separate, but leave the yoke and body portion in one piece.

Having described my said improved system of cutting a shirt or shirt-pattern, what I claim therein is as follows:

I claim, first, my improved system of cutting shirts or shirt-patterns, the same consisting in the employment or combination of a front-plate or pattern, O, a series of yoke-plates or patterns, A A$^1$, &c., a back-side plate, S, a front-side plate, R, a sleeve-pattern, Q, and a bosom-pattern, H, the whole being constructed substantially in manner as set forth, and to be used together, as and for the purpose described.

I also claim the combination therewith of the series of plates I I', &c., for cutting out the neck portion of a bosom, as set forth.

I also claim the combination of the front-plate O with one or more yoke-plates, A, &c., each of such parts being provided with a scale of measurements or divisions so combined or arranged that the corresponding figures on each indicate the width, respectively, for cutting the front and back parts of shirts or shirt-patterns of any ordinary size.

I do not claim broadly making a plate or pattern for the yoke of a shirt, but what I do claim is a yoke, formed with a series of measurements or scale of divisions arranged near each end of it, in manner as set forth.

I also claim the front-plate O, provided not only with a scale of divisions, arranged as set forth, but formed with a rectangular bosom-space, A B C D, as explained.

J. W. RAND.

Witnesses:
    Thomas H. Sylvester,
    Lyman H. Bigelow.